United States Patent
Zhu et al.

(10) Patent No.: US 10,536,076 B2
(45) Date of Patent: Jan. 14, 2020

(54) CHARGE PUMP CONTROL CIRCUIT

(71) Applicant: Shanghai Huahong Grace Semiconductor Manufacturing Corporation, Shanghai (CN)

(72) Inventors: Wenyi Zhu, Shanghai (CN); Jun Xiao, Shanghai (CN)

(73) Assignee: Shanghai Huahong Grace Semiconductor Manufacturing Corporation, Shanghai (CN)

(*) Notice: Subject to any disclaimer, the term of this patent is extended or adjusted under 35 U.S.C. 154(b) by 0 days.

(21) Appl. No.: 16/127,328

(22) Filed: Sep. 11, 2018

(65) Prior Publication Data

US 2019/0379280 A1    Dec. 12, 2019

(30) Foreign Application Priority Data

Jun. 7, 2018  (CN) .......................... 2018 1 0581721

(51) Int. Cl.
  *G05F 3/02*    (2006.01)
  *H02M 3/07*    (2006.01)
(52) U.S. Cl.
  CPC ..................................... *H02M 3/07* (2013.01)
(58) Field of Classification Search
  CPC ....... H03M 3/07; H03M 3/073; H03L 7/0895; H03L 7/0896; G05F 3/205
  See application file for complete search history.

(56) References Cited

U.S. PATENT DOCUMENTS

| | | | |
|---|---|---|---|
| 6,690,148 B2* | 2/2004 | Harrison | H02M 3/073 323/281 |
| 6,750,639 B2* | 6/2004 | Harrison | H02M 3/073 323/281 |
| 6,753,675 B2* | 6/2004 | Harrison | H02M 3/073 323/281 |
| 2015/0145591 A1 | 5/2015 | Fischer et al. | |

FOREIGN PATENT DOCUMENTS

| | | |
|---|---|---|
| CN | 103389771 A | 11/2013 |
| CN | 103812333 A | 5/2014 |
| CN | 106160462 A | 11/2016 |
| CN | 106849644 A | 6/2017 |

OTHER PUBLICATIONS

First Chinese Office Action regarding Chinese Application No. 201810581721.4 dated Apr. 26, 2019.

* cited by examiner

*Primary Examiner* — Long Nguyen
(74) *Attorney, Agent, or Firm* — Harness, Dickey & Pierce, P.L.C.

(57) ABSTRACT

A charge pump control circuit is provided in embodiments of the present disclosure, and the charge pump control circuit includes: a charge pump, having a clock interface; a feedback circuit, configured to sample an output voltage of the charge pump to obtain a sampling voltage; a reference voltage generating circuit, having an output terminal outputting a reference voltage; and a comparator, configured to compare the sampling voltage with the reference voltage; wherein the charge pump control circuit further includes: a logic combination circuit, wherein an input terminal of the logic combination circuit is coupled with an output terminal of the comparator, and the logic combination circuit is configured to generate a clock pulse signal according to a comparison result outputted by the comparator, and the (Continued)

clock pulse signal is transmitted to the clock interface of the charge pump.

9 Claims, 5 Drawing Sheets

CHARGE PUMP CONTROL CIRCUIT

CROSS-REFERENCE TO RELATED APPLICATIONS

This application claims the benefit of priority to Chinese Patent Application No. 201810581721.4, titled "CHARGE PUMP CONTROL CIRCUIT", filed on Jun. 7, 2018, the entire disclosure of which is incorporated herein by reference.

TECHNICAL FIELD

The disclosure generally relates to a circuit technology field, and more particularly, to a charge pump control circuit.

BACKGROUND

The charge pump is a DC-DC converter that uses "fast" or "pumped" capacitors to store energy. Its significant advantages in size and cost make the charge pump popular and widely used in various power chip products. The charge pump requires a control circuit to control its operating mode and operating state, and a conventional charge pump control circuit includes a reference voltage generating module, a feedback circuit module, a control module, a comparator module, and an oscillator. By comparing a sampling voltage with a reference voltage, a clock pulse signal outputted by the oscillator is adjusted to drive an operation of the charge pump.

The existing charge pump control circuit is provided with an oscillator, and the oscillator has a complicated circuit and many devices therein, so that a chip area is occupied, a power consumption is increased, and the formation of the clock pulse signal requires a certain settling time, resulting in a trigger delay of the charge pump.

SUMMARY

Embodiments of the present disclosure may optimize a chip area and reduce power consumption.

Embodiments of the present disclosure provide a charge pump control circuit that can provide a required clock signal to a charge pump without an oscillator.

Embodiments of the present disclosure provide a charge pump control circuit, which includes: a charge pump, having a clock interface; a feedback circuit, configured to sample an output voltage of the charge pump to obtain a sampling voltage; a reference voltage generating circuit, having an output terminal outputting a reference voltage; and a comparator, configured to compare the sampling voltage with the reference voltage; wherein the charge pump control circuit further includes: a logic combination circuit, wherein an input terminal of the logic combination circuit is coupled with an output terminal of the comparator, and the logic combination circuit is configured to generate a clock pulse signal according to a comparison result outputted by the comparator, and the clock pulse signal is transmitted to the clock interface of the charge pump.

In some embodiment, a positive pole of the comparator is configured to receive the sampling voltage, and a negative pole of the comparator is configured to receive the reference voltage; wherein the logic combination circuit includes a clock pulse signal generation module for generating the clock pulse signal, and the clock pulse signal generation module includes: a NOT gate, having an input terminal coupled with the output terminal of the comparator; a delay module; and a first NOR gate, having a first input terminal coupled with an output terminal of the NOT gate through the delay module, a second input terminal coupled with the output terminal of the comparator, and an output terminal outputting the clock pulse signal.

In some embodiment, a positive pole of the comparator is configured to receive the reference voltage, and a negative pole of the comparator is configured to receive the sampling voltage; wherein the logic combination circuit includes a clock pulse signal generation module for generating the clock pulse signal, and the clock pulse signal generation module includes: a delay module; a first NOT gate, having an input terminal coupled with the output terminal of the comparator; a NAND gate, having a first input terminal coupled with the output terminal of the first NOT gate through the delay module, and a second input terminal coupled with the output terminal of the comparator; and a second NOT gate, having an input terminal receiving a signal of the output terminal of the NAND gate, and an output terminal outputting the clock pulse signal.

In some embodiment, the reference voltage generating circuit obtains the reference voltage by sampling a voltage of a power supply of the charge pump control circuit.

In some embodiment, the reference voltage generating circuit includes: a first resistor, having a first terminal is coupled with a first terminal of a first switch, wherein a second terminal of the first switch is coupled with the power supply; a second resistor, having a first terminal coupled with a second terminal of the first resistor, and a second terminal grounded; a first capacitor, having a first plate coupled with the power supply; and a second capacitor, having a first plate coupled with the first plate of the first capacitor and a first terminal of a second switch, and a second plate grounded, wherein a second terminal of the second switch is coupled with the first terminal of the second resistor; wherein control terminals of the first switch and the second switch are configured to receive a control signal outputted by a controller which is configured to generate the control signal according to the comparison result outputted by the comparator.

In some embodiment, the reference voltage generating circuit further includes: a third capacitor, having a first plate coupled with the first terminal of the second resistor, and a second plate grounded.

In some embodiment, the feedback circuit includes: a third resistor, having a first terminal coupled with a first terminal of a third switch, wherein a second terminal of the third switch is coupled with an output terminal of the charge pump; a fourth resistor, having a first terminal coupled with a second terminal of the third resistor, and a second terminal grounded; a fourth capacitor, having a first plate coupled with the output terminal of the charge pump, a second plate coupled with a first terminal of a fourth switch, wherein a second terminal of the fourth switch is coupled with the first terminal of the fourth resistor; and a fifth capacitor, having a first plate coupled with the second plate of the fourth capacitor, and a second plate grounded; wherein control terminals of the third switch and the fourth switch are configured to receive a control signal outputted by a controller, which is configured to generate the control signal according to the comparison result outputted by the comparator.

In some embodiment, the reference voltage generating circuit includes a protection circuit, and when the output voltage decreases, and the sampling voltage cannot re-follow the reference voltage within one pulse width of the clock pulse signal, the protection circuit releases a charge of the output terminal of the reference voltage generating circuit until the sampling voltage is higher than the reference voltage.

In some embodiment, the protection circuit includes a switch transistor and a fifth switch, wherein a drain of the switch transistor is coupled with a first terminal of the fifth switch, a second terminal of the fifth switch is coupled with the output terminal of the reference voltage generating circuit, a source of the switch transistor is grounded, and a gate of the switch transistor is coupled with a predetermined bias voltage; and wherein the logic combination circuit includes a switch control signal generating module, wherein the switch control signal generating module is configured to generate a switch control signal according to the comparison result outputted by the comparator and the clock pulse signal, and a control terminal of the fifth switch is configured to receive the switch control signal.

In some embodiment, the switch control signal generating module includes a second NOR gate, wherein the second NOR gate has a first input terminal receiving an output signal outputted by the comparator, a second input terminal receiving the clock pulse signal, and an output terminal outputting the switch control signal.

Compared with existing techniques, embodiments of the present disclosure have following advantages.

In embodiments of the present disclosure, a logic combination circuit is used to replace an oscillator in the prior art to provide a clock pulse signal to the charge pump, which is beneficial to reduce a chip area and power consumption. In addition, in embodiments of the disclosure, it is also ensured that a clock pulse signal is provided to a charge pump accurately and timely.

Further, in embodiments of the disclosure, the charge pump control circuit may also include a protection circuit. When the output voltage decreases, and the sampling voltage cannot re-follow the reference voltage within one pulse width of the clock pulse signal, the protection circuit releases a charge of an output terminal of the reference voltage generating circuit until the sampling voltage is higher than the reference voltage, and then a voltage pumping is then carried out in the next cycle. Therefore, even if the output voltage is greatly reduced, the control circuit can quickly enable the charge pump to pump a voltage of an output terminal of the charge pump, which returns the output voltage to a pumping state.

Further, in embodiments of the disclosure, the reference voltage generating circuit includes a large capacitor. Therefore, after the power supply is turned on, since the reference voltage generating circuit has a large time constant RC, an establishment speed of the reference voltage is much smaller than an establishment speed of the sampling voltage, so that the reference voltage can be slowly established. Accordingly, a fluctuation of the overall circuit voltage during a reference voltage establishment process is small.

DETAILED DESCRIPTION

The foregoing objects, features and advantages of the present disclosure will become more apparent from the following detailed description of specific embodiments of the disclosure taken in conjunction with the accompanying drawings. Apparently, the disclosure only states a part of the embodiments, and not all of them. All other embodiments obtained by those skilled in the art based on the embodiments of the present disclosure without creative efforts are within the scope of the present disclosure.

Figure 1:
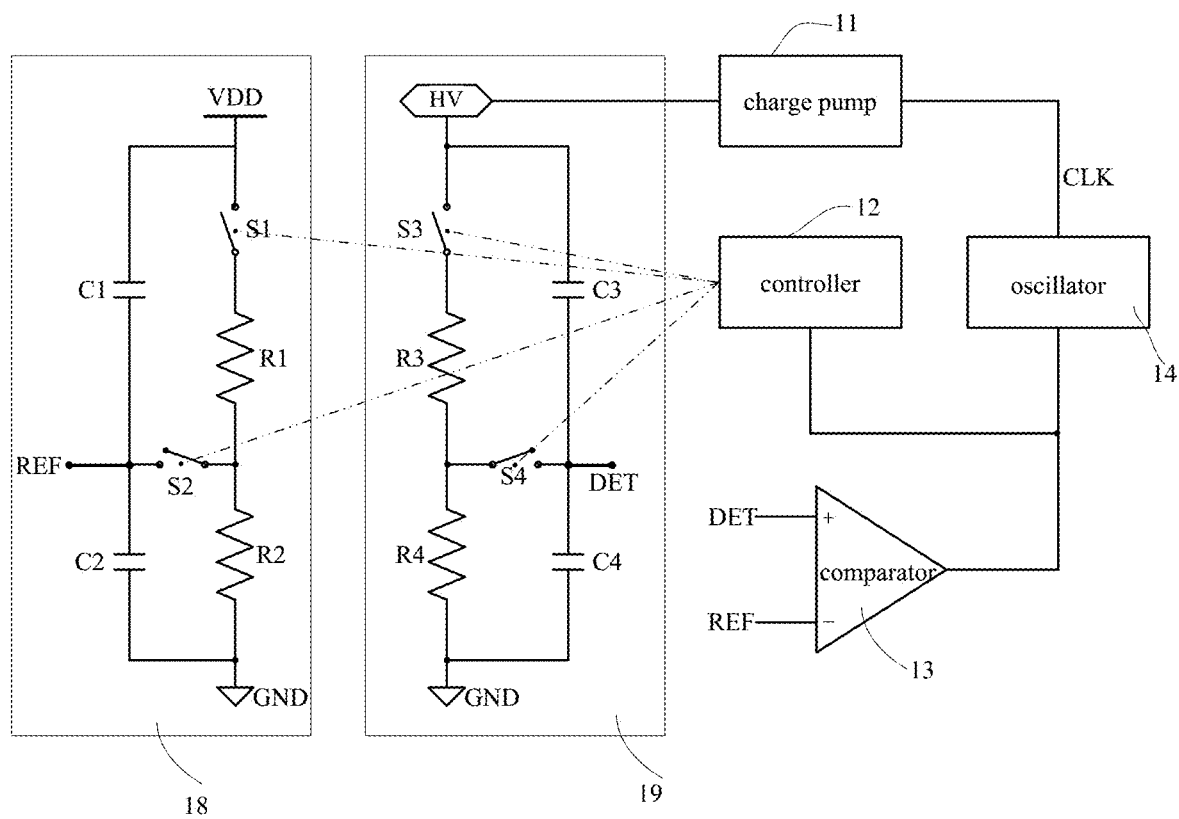
FIG. 1 schematically illustrates a structural diagram of an existing charge pump control circuit.

FIG. 1 schematically illustrates a structural diagram of an existing charge pump control circuit.

Referring to FIG. 1, the existing charge pump control circuit includes a charge pump 11, a controller 12, a feedback circuit 19, a reference voltage generating circuit 18, a comparator 13 and an oscillator 14. The reference voltage generating circuit 18 includes a first capacitor C1, a second capacitor C2, a first resistor R1, a second resistor R2, a first switch S1, and a second switch S2. An output terminal of the reference voltage generating circuit 18 provides a reference voltage REF, and the output terminal of the reference voltage generating circuit 18 is coupled with ground GND through the second capacitor C2. The feedback circuit 19 includes a third capacitor C3, a fourth capacitor C4, a third resistor R3, a fourth resistor R4, a third switch S3, and a fourth switch S4. An output terminal of the feedback circuit 19 provides a sampling voltage DET, and the output terminal of the feedback circuit 19 is coupled with ground GND through the fourth capacitor C4. Two input terminals of the comparator 13 receive the reference voltage REF and the sampling voltage DET respectively, and a control signal outputted by the controller 12 controls the turning on and turning off of the first switch S1, the second switch S2, the third switch S3, and the fourth switch S4. After the power supply VDD is turned on, an output terminal of the charge pump 11 outputs a pumped output voltage HV, and the pumped output voltage HV is configured to supply power to a load. When the circuit is stably operated, the output voltage HV inevitably fluctuates due to external interference or the load itself. When the output voltage HV of the charge pump 11 decreases, the feedback circuit 19 recognizes the state of decreasing. At this time, the sampling voltage DET is lower than the reference voltage REF, the output level of the comparator 13 is inverted to trigger the oscillator 14. The oscillator 14 inputs the clock pulse signal CLK to a clock interface of the charge pump 11, and the charge pump 11 increases the output voltage HV according to the corresponding clock pulse signal CLK, to return the output voltage HV back to a voltage state at the time of stable operation of the circuit.

For the existing charge pump control circuit, the clock pulse signal CLK required by the operation of the charge pump 11 is derived from the oscillator 14. However, the oscillator 14 has a complicated device structure and occupies a large space, and its complicated device structure also increases power consumption of the entire chip.

Embodiments of the present invention provide an improved charge pump control circuit that does not require an oscillator, but instead employs a logic combination circuit to provide a clock pulse signal to the charge pump.

Figure 2:
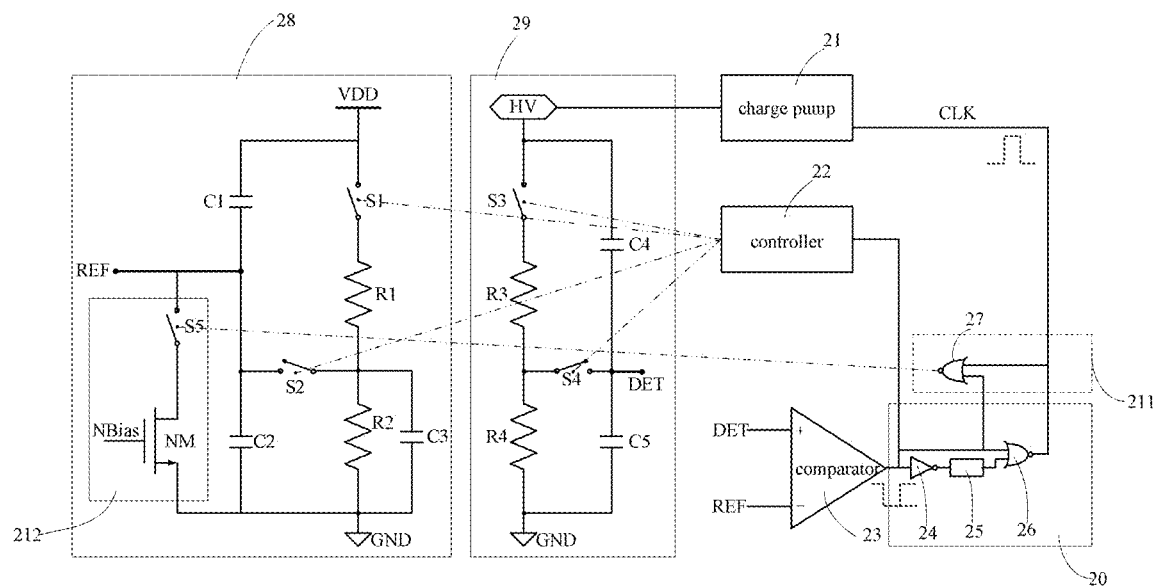
FIG. 2 schematically illustrates a structural diagram of a charge pump control circuit according to an embodiment of the present disclosure.

FIG. 2 schematically illustrates a structural diagram of a charge pump control circuit according to an embodiment of the present disclosure. The charge pump control circuit includes: a charge pump 21, having a clock interface; a feedback circuit 29, configured to sample an output voltage HV of the charge pump 21 to obtain a sampling voltage DET; a reference voltage generating circuit 28, having an output terminal outputting a reference voltage REF; and a comparator 23, configured to compare the sampling voltage DET with the reference voltage REF.

Further, in FIG. 2, the charge pump control circuit further includes: a logic combination circuit, and the an input terminal of the logic combination circuit is coupled with an output terminal of the comparator 23, and the logic combination circuit is configured to generate a clock pulse signal CLK according to a comparison result outputted by the comparator 23, and the clock pulse signal CLK is transmitted to the clock interface of the charge pump 21.

In some embodiment, a positive pole of the comparator 23 is configured to receive the sampling voltage DET, and a negative pole of the comparator 23 is configured to receive the reference voltage REF. The logic combination circuit may include a clock pulse signal generation module 20 for generating the clock pulse signal CLK, and the clock pulse signal generation module 20 includes: a NOT gate 24, having an input terminal coupled with the output terminal of the comparator 23; a delay module 25; and a first NOR gate 26, having a first input terminal coupled with an output terminal of the NOT gate 24 through the delay module 25, and a second input terminal coupled with the output terminal of the comparator 23, and an output terminal outputting the clock pulse signal CLK.

Further, in FIG. 2, the delay module 25 and the NOT gate 24 are disposed in a same branch. Since the NOT gate 24 has a certain signal delay during operation, compared with other connection methods, when a same signal delay width is required, a series arrangement of the delay module 25 and the NOT gate 24 can effectively reduce a number of logic devices in the delay module 25, which reduces power consumption and a chip area.

The reference voltage generating circuit 28 may acquire the reference voltage REF by sampling a voltage of a power supply VDD of the charge pump control circuit.

Further, in FIG. 2, the reference voltage generating circuit 28 may include: a first resistor R1, having a first terminal is coupled with a first terminal of a first switch S1, and wherein a second terminal of the first switch S1 is coupled with the power supply VDD; a second resistor, having a first terminal coupled with the second terminal of the first resistor R1, and a second terminal coupled with ground GND; a first capacitor C1, having a first plate coupled with the power supply VDD; a second capacitor C2, having a first plate coupled with the first plate of the first capacitor C1 and a first terminal of a second switch S2, and a second plate coupled with ground GND, wherein the second terminal of the second switch S2 is coupled with the first terminal of the second resistor R2. Control terminals of the first switch S1 and the second switch S2 receive a control signal outputted by a controller 22, and the controller 22 is configured to generate the control signal according to the comparison result outputted by the comparator 23.

Further, in FIG. 2, the reference voltage generating circuit 28 may further includes: a third capacitor C3, having a first plate coupled with the first terminal of the second resistor R2, and a second plate coupled with ground GND. The third capacitor C3 is coupled with the second resistor R2 to obtain a large time constant RC, so that when the power supply VDD is turned on, an establishment speed of the reference voltage REF is smaller than an establishment speed of the sampling voltage. In an establishing process of gradual raise, the reference voltage REF is lower than the sampling voltage DET firstly and then higher than the sampling voltage DET, so that the logic combination circuit can generate a clock pulse signal CLK. The clock pulse signal CLK drives the charge pump 21 to raise the output voltage HV. Since the sampling voltage DET is established at a high speed, and is higher than the reference voltage REF quickly. The reference voltage REF continues to rise slowly, and after a certain time, it reaches a value of the sampling voltage DET, and then triggers a next clock pulse signal CLK. That process is repeated until the reference voltage REF tends to be stable, while the output voltage HV of the charge pump 21 is established.

The feedback circuit 29 includes: a third resistor R3, having a first terminal coupled with a first terminal of a third switch S3, wherein a second terminal of the third switch S3 is coupled with an output terminal of the charge pump 21; a fourth resistor, having a first terminal coupled with a second terminal of the third resistor R3, and a second terminal coupled with ground GND; a fourth capacitor C4, having a first plate coupled with the output terminal of the charge pump 21, a second plate coupled with a first terminal of a fourth switch S4, wherein a second terminal of the fourth switch S4 is coupled with the first terminal of the fourth resistor R4; a fifth capacitor C5, having a first plate coupled with the second plate of the fourth capacitor C4, and a second plate coupled with ground GND.

Control terminals of the third switch S3 and the fourth switch S4 receive a control signal outputted by a controller 22, and the controller 22 is configured to generate the control signal according to the comparison result outputted by the comparator 23. The feedback circuit 29 is configured to obtain the sampling voltage DET by sampling the output voltage HV of the charge pump 21 through the third resistor R3 and the fourth resistor R4. A sampling output terminal is disposed at the second terminal of the third resistor R3.

When the charge pump 21 operates, the output terminal of the charge pump 21 charges the fourth capacitor C4 and the fifth capacitor C5. When the third switch R3 and the fourth switch R4 are turned on, the sampling voltage DET can be obtained at the sampling output terminal; when the third switch R3 and the fourth switch R4 are turned off, the fourth capacitor C4 and the fifth capacitor for storing energy C5 can maintain the sampled voltage value.

Further, in FIG. 2, the reference voltage generating circuit 28 may further include a protection circuit 212 including a switch transistor NM and a fifth switch S5. The drain of the switch transistor NM is coupled with a first terminal of the fifth switch S5, a second terminal of the fifth switch S5 is coupled with an output terminal of the reference voltage generating circuit 28, a source of the switching transistor NM is coupled with ground GND, and a gate of the switching transistor NM is coupled with a predetermined bias voltage NBias. In some embodiment, the switch transistor NM maybe an NMOS transistor. Compared with other types of switch transistors, the NMOS transistor has a small conduction resistance. After the protection circuit is turned on, the NMOS transistor consumes less power and saves energy.

When the output voltage HV of the charge pump 21 decreases, and the sampling voltage DET cannot re-follow the reference voltage REF within one pulse width of the clock pulse signal CLK, the protection circuit 212 releases a charge of an output terminal of the reference voltage generating circuit until the sampling voltage DET is higher than the reference voltage REF. The above "follow" means that the sampling voltage DET fluctuates between a certain predetermined error based on the reference voltage REF. The waveform trend of the sampling voltage DET is substantially the same as the reference voltage REF. When the sampling voltage DET deviates from the reference voltage REF beyond the predetermined error, it is considered that the sampling voltage DET cannot follow the reference voltage REF.

Further, in FIG. 2, the logic combining circuit may include a switch control signal generating module 211. The switch control signal generating module 211 includes a second NOR gate 27, wherein the second NOR gate 27 has a first input terminal receiving an output signal outputted by the comparator 23, a second input terminal receiving the clock pulse signal CLK, and an output terminal outputting the switch control signal. The switch control signal is configured to control the fifth switch S5 to be closed or opened.

Figure 3:
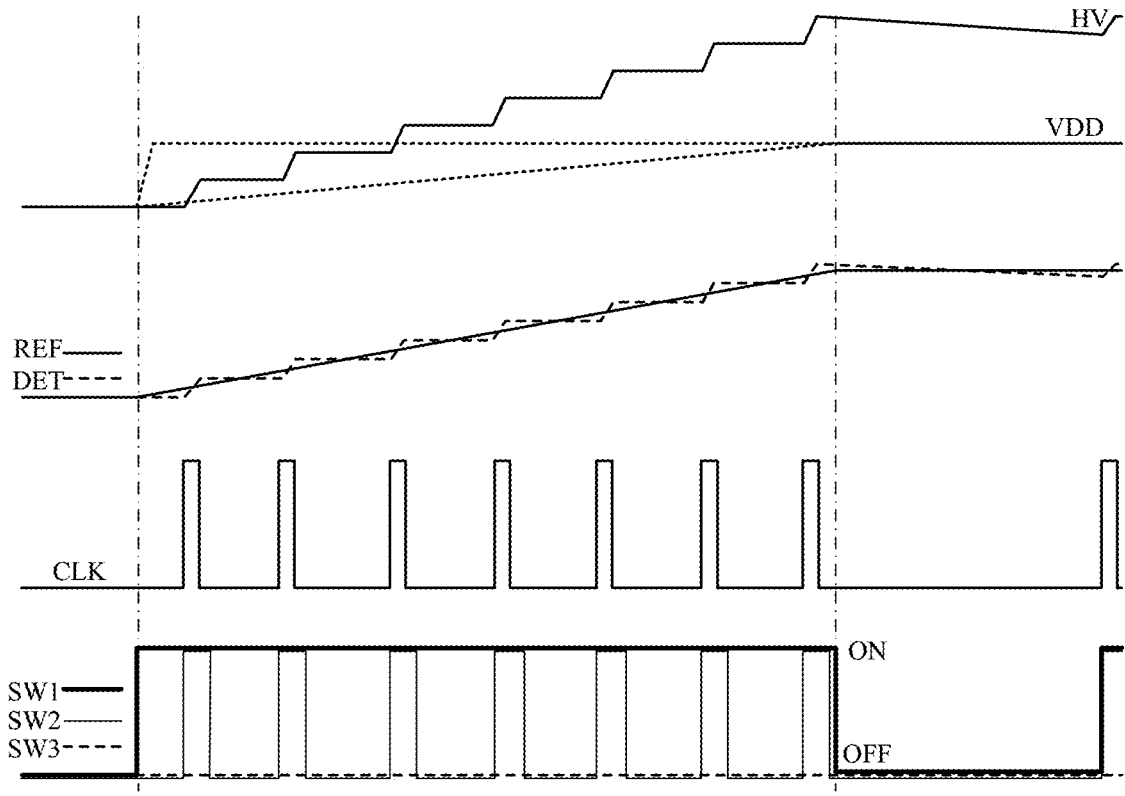
FIG. 3 schematically illustrates a diagram showing an operation waveform of a charge pump control circuit when a voltage is established according to an embodiment of the present disclosure.

Referring FIG. 2 and FIG. 3, FIG. 3 schematically illustrates a diagram showing an operation waveform of a charge pump control circuit when a voltage is established according to an embodiment of the present disclosure. During the process of establishing the output voltage HV, the first switch S1 and the second switch S2 are controlled to remain turned off by a signal SW1. Since the reference voltage generating circuit 28 has a large time constant, the reference voltage REF of a reference voltage output terminal is slowly established. The third switch S3 and the fourth switch S4 are controlled by a signal SW2, and are simultaneously opened or closed periodically. When the third switch S3 and the fourth switch S4 are closed, the sampling voltage DET is acquired at a sampling voltage output terminal, and the comparator 23 compares the reference voltage REF with the sampling voltage DET. If the sampling voltage DET is lower than the reference voltage REF, an output level of the comparator 23 is inverted, and the clock pulse signal CLK is generated by the inverted level signal through the logic combining circuit. The clock pulse signal CLK is inputted to the clock interface of the charge pump 21. The charge pump 21 performs a voltage pumping according to the corresponding clock pulse signal CLK, to increase the output voltage HV. At the same time, since the third switch S3 and the fourth switch S4 are not opened immediately, voltages of the reference voltage output terminal and the sampling voltage output terminal are updated, and the updated reference voltage REF and the sampling voltage DET are inputted to the comparator 23 again. The comparator 23 re-compares the updated reference voltage REF and the sampling voltage DET and performs a further voltage pumping. With a slow establishment of the reference voltage REF, after the output voltage HV of the charge pump 21 is pumped in several cycles, the output voltage HV is pumped to a stable voltage state following a rise of the voltage of the power supply VDD.

When the output voltage HV of the charge pump 21 reaches the stable voltage state, the circuit begins to operate stably. Thereafter, if the output voltage HV decreases due to an external interference or the load itself, a decreasing state of the output voltage HV is reflected on the feedback circuit 29 in time, that is, the sampling voltage DET is lower than the reference voltage REF. The output level of the output terminal of the comparator 23 is inverted, the inverted level signal is inputted to the logic combination circuit, the logic combination circuit outputs the clock pulse signal CLK, and the charge pump 21 is driven to complete a voltage pumping action of one clock cycle and improve the output voltage HV. At the same time, the reference voltage REF and the sampling voltage DET are updated and then are acquired to the comparator 23 again.

Figure 4:
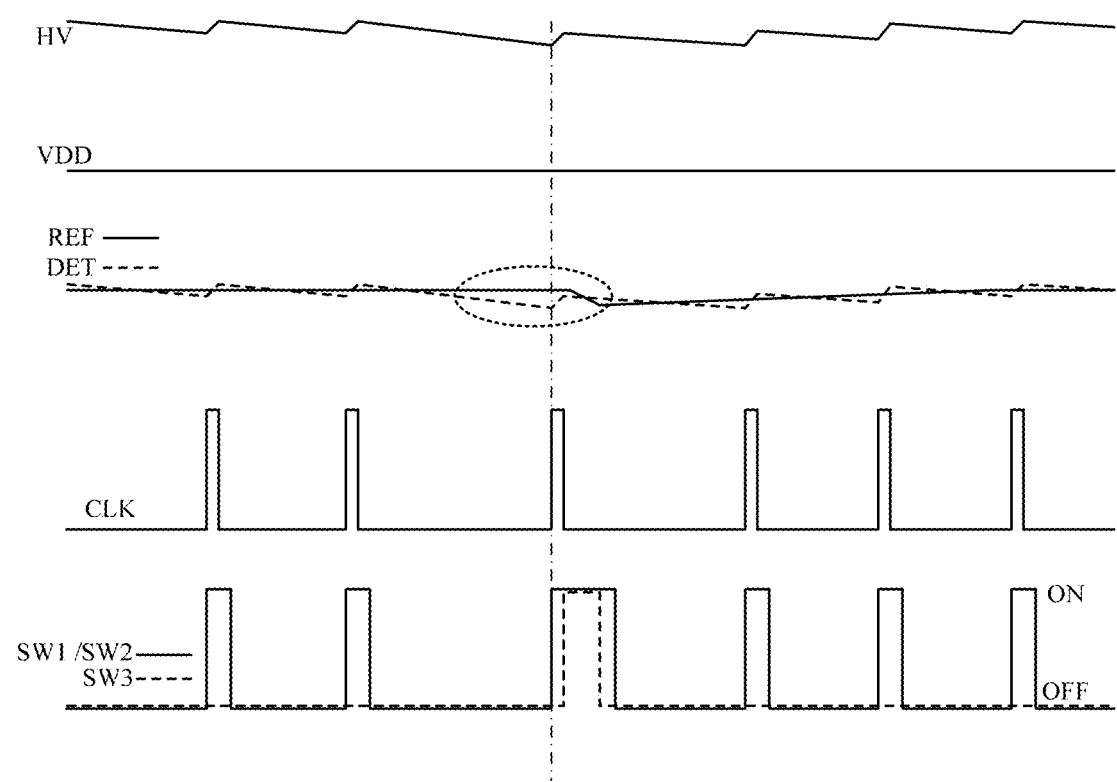
FIG. 4 schematically illustrates a diagram showing an operation waveform of a charge pump control circuit after a voltage is stabilized according to an embodiment of the present disclosure.
Figure 5:
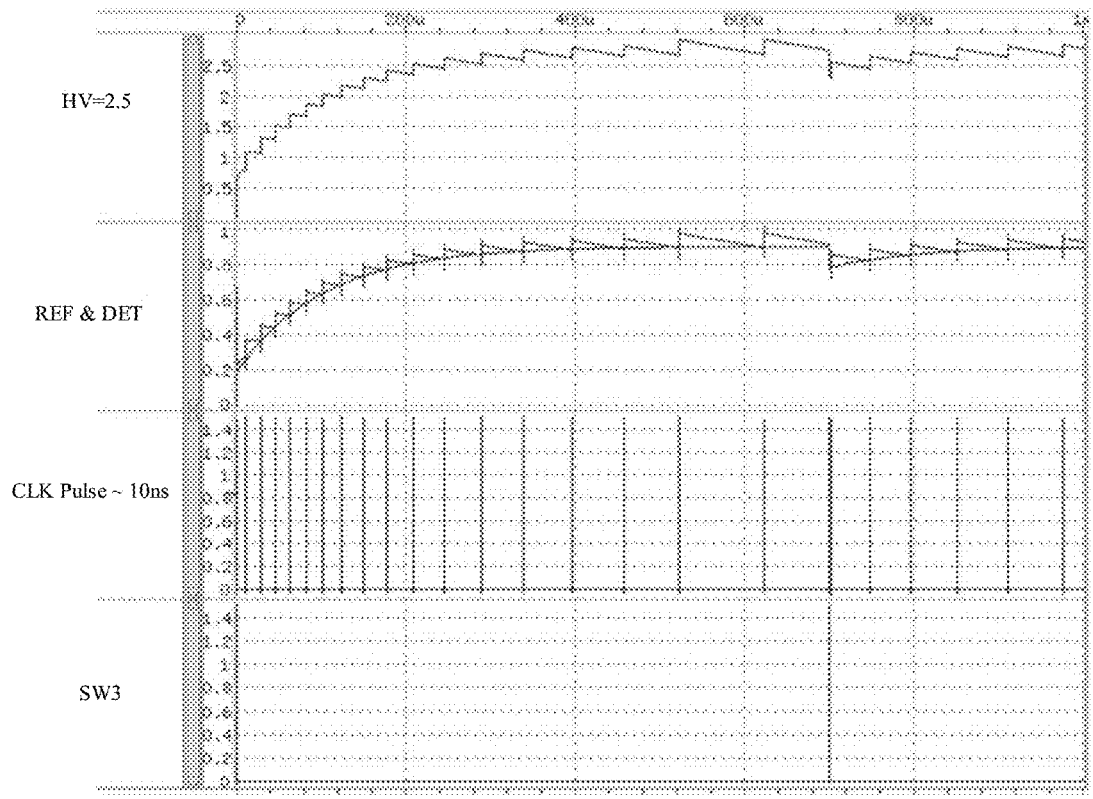
FIG. 5 schematically illustrates a diagram of a simulation result of the circuit according to an embodiment of the present disclosure.

Referring to FIG. 2, FIG. 4 and FIG. 5. FIG. 4 schematically illustrates a diagram showing an operation waveform of a charge pump control circuit after a voltage is stabilized according to an embodiment of the present disclosure; and FIG. 5 schematically illustrates a diagram of a simulation result of the circuit according to an embodiment of the present disclosure.

When the voltage of the power supply VDD is in a stable state, the output voltage HV of the charge pump 21 is greatly reduced, and within a pulse width of the clock pulse signal CLK, the sampling voltage DET cannot re-follow the reference voltage REF, the switch control signal generating module 211 in the logic combination circuit supplies the protection circuit 212 with a control signal SW3 that controls the fifth switch S5 to be closed. The protection circuit 212 releases the charge at the output of the reference voltage generating circuit 28 until the sampling voltage DET is higher than the reference voltage REF. Since the first switch S1 and the second switch S2 controlled by the control signal SW1 are closed with a delay compared with the fifth switch S5 controlled by the control signal SW3, the reference voltage REF is slowly increased, and the comparator 23 compares the updated reference voltage REF and the sampling voltage DET again. A voltage pumping in the next cycle is further performed to achieve a stable pumping voltage outputted by the charge pump 21.

During the operation of the protection circuit 212, the first switch S1 and the second switch S2 are kept closed, so that after the fifth switch S5 in the protection circuit 212 is opened, the reference voltage REF can be quickly established, and unnecessary switching loss caused by frequent opening and closing of the first switch S1 and the second switch S2 in the circuit is avoided.

Those skilled in the art may understand may understand that, the logic combination circuit capable of generating a clock pulse signal in cooperation with the output signal of the comparator is not limited to the structure described in above embodiments, and it is also possible to implement a function of the clock pulse signal generator by using following logic combination circuits.

Figure 6:
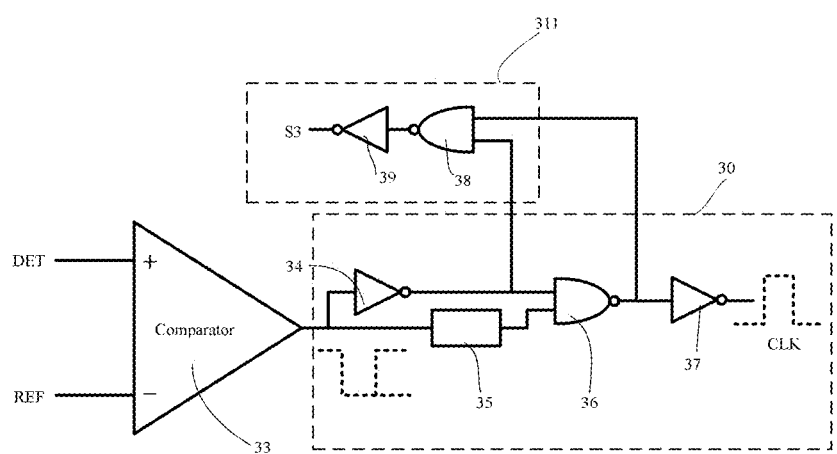
FIG. 6 schematically illustrates a structural diagram of an alternative logic combination circuit according to an embodiment of the present disclosure.

Referring to FIG. 6, in an alternative logic combination circuit, a positive pole of the comparator 33 is configured to receive the reference voltage REF, and a negative pole of the comparator 33 is configured to receive the sample voltage DET. The clock pulse signal generating module 30 in the logic combining circuit includes: a delay module 35; a first NOT gate 34, having an input terminal coupled with an output terminal of the comparator 33; a NAND gate 36, having a first input terminal coupled with the output terminal of the comparator 33 through the delay module 35, and a second input terminal coupled with an output terminal of the first NOT gate 34; and a second NOT gate 37, having an input terminal receiving a signal of an output terminal of the NAND gate 36, and an output terminal outputting the clock pulse signal CLK required for a voltage pumping of charge pump 21 (referring to FIG. 2).

In some embodiment, the logic combination circuit may further include a switch control signal generating module 311. The switch control signal generating module 311 includes a second NAND gate 38 and a third NOT gate 39. The second NAND gate 38 has a first input terminal receiving a signal from an output terminal of the first NOT gate 34, a second input terminal receiving the clock pulse signal CLK, and an output terminal coupled with an input terminal of the third NOT gate 39. The output terminal of the third NOT gate 39 outputs a switch control signal that can control the fifth switch S5 (referring to FIG. 2) of the protection circuit 212 (referring to FIG. 2) to be closed or opened.

In this logic combination circuit, the delay module 35 and the first NOT gate 34 are respectively disposed in two different branches, which effectively reduces mutual interference when the first NOT gate 34 and the delay module 35 operate.

Figure 7:
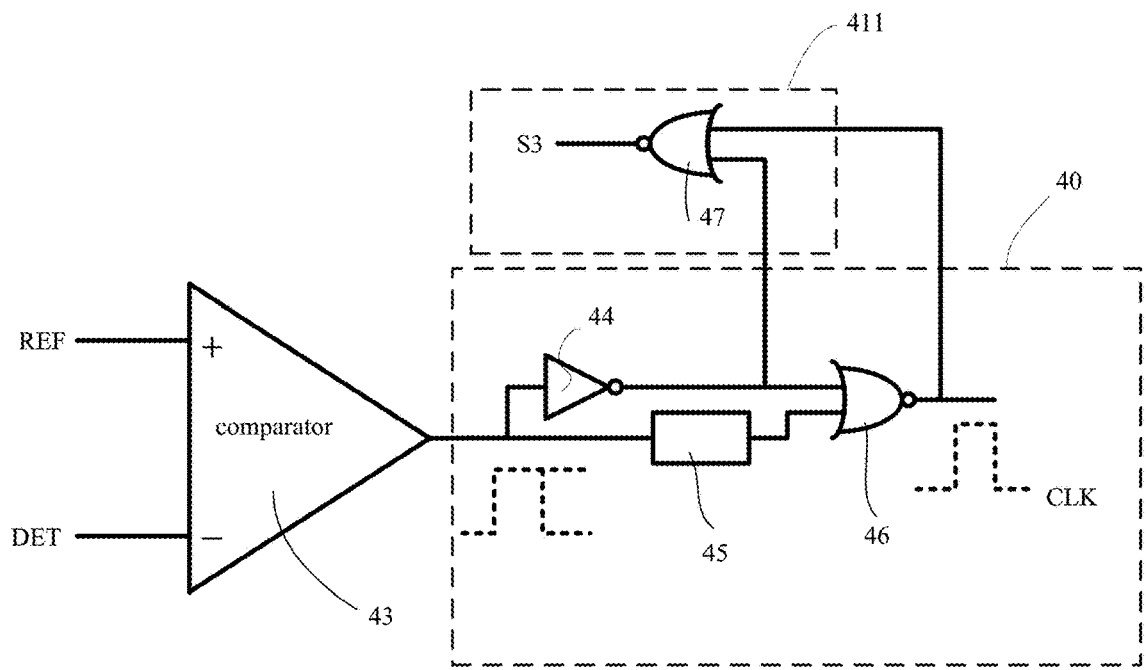
FIG. 7 schematically illustrates a structural diagram of an alternative logic combination circuit according to an embodiment of the present disclosure.

Referring to FIG. 7, in an alternative logic combination circuit, a positive pole of the comparator 43 is configured to receive the reference voltage REF, and a negative pole of the comparator 43 is configured to receive the sample voltage DET. The clock pulse signal generating module 40 in the logic combining circuit includes: a NOT gate 44, having an input terminal receiving a signal of an output terminal of the comparator 43; and a first NOR gate 46, having a first input terminal receiving a signal from an output terminal of the NOT gate 44, a second input terminal coupled with the output terminal of the comparator 43 through the delay module 45, and an output terminal of the first NOR gate 46 outputting the clock pulse signal CLK required for a voltage pumping of the charge pump 21 (referring to FIG. 2).

In some embodiment, the logic combination circuit may further include a switch control signal generating module 411. The switch control signal generating module 30 includes a second NOR gate 47. The second NOR gate 47 have a first input terminal receiving the signal from the output terminal of the NOT gate 44, a second input terminal receiving the clock pulse signal CLK, and an output terminal outputting the switch control signal that can control the fifth switch S5 (referring to FIG. 2) of the protection circuit 212 (referring to FIG. 2) to be closed or opened.

In this logic combination circuit, the delay module 45 and the NOT gate 44 are respectively disposed in two different branches, which effectively reduces mutual interference when the NOT gate 44 and the delay module 45 operate.

Figure 8:
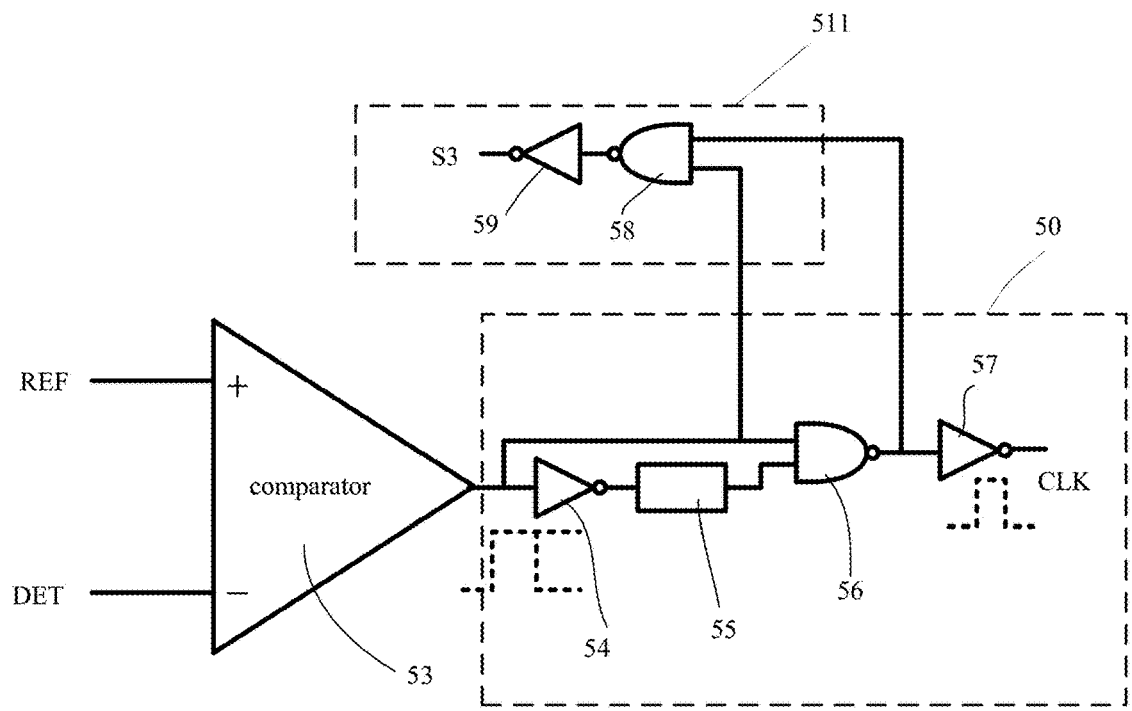
FIG. 8 schematically illustrates a structural diagram of an alternative logic combination circuit according to an embodiment of the present disclosure.

Referring to FIG. 8, in an alternative logic combination circuit, a positive pole of the comparator 53 is configured to receive the reference voltage REF, and a negative pole of the comparator 53 is configured to receive the sample voltage DET. The clock pulse signal generating module 50 in the logic combining circuit includes: a first NOT gate 54, having an input terminal coupled with an output terminal of the comparator 53; a delay module 55; a first NAND gate 56, having a first input terminal coupled with an output terminal of the first NOT gate 54 through the delay module 55, and a second input terminal receiving a single from the output terminal of the comparator 53; and a second NOT gate 57, having an input terminal receiving a signal of an output terminal of the NAND gate 56, and an output terminal outputting the clock pulse signal CLK required for a voltage pumping of charge pump 21 (referring to FIG. 2).

In some embodiment, the logic combination circuit may further include a switch control signal generating module 511. The switch control signal generating module 30 includes a second NAND gate 58 and a third NOT gate 59. The second NAND gate 58 have a first input terminal receiving a signal from an output terminal of the comparator 53, a second input terminal receiving a signal from the output terminal of the first NAND gate 56, and an output terminal coupled with an input terminal of the third NOT gate 59. The output terminal of the third NOT gate 59 outputs a switch control signal that can control the fifth switch S5 (referring to FIG. 2) of the protection circuit 212 (referring to FIG. 2) to be closed or opened.

In this logical combination circuit, the delay module 55 and the first NOT gate 54 are disposed in a same branch. Since the first NOT gate 54 has a certain signal delay during operation, when a same signal delay width is required, a series arrangement of the delay module 55 and the NOT gate 54 can effectively reduce a number of logic devices in the delay module 55, which reduces power consumption and a chip area.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

The invention claimed is:
1. A charge pump control circuit, comprising:
a charge pump, having a clock interface;
a feedback circuit, configured to sample an output voltage of the charge pump to obtain a sampling voltage;
a reference voltage generating circuit, having an output terminal outputting a reference voltage; and
a comparator, configured to compare the sampling voltage with the reference voltage;
wherein the charge pump control circuit further comprises:
a logic combination circuit, wherein an input terminal of the logic combination circuit is coupled with an output terminal of the comparator, and the logic combination circuit is configured to generate a clock pulse signal according to a comparison result outputted by the comparator, and the clock pulse signal is transmitted to the clock interface of the charge pump,
wherein the reference voltage generating circuit comprises a protection circuit, and when the output voltage decreases, and the sampling voltage cannot re-follow the reference voltage within one pulse width of the clock pulse signal, the protection circuit releases a charge of the output terminal of the reference voltage generating circuit until the sampling voltage is higher than the reference voltage.

2. The charge pump control circuit according to claim 1, wherein a positive pole of the comparator is configured to receive the sampling voltage, and a negative pole of the comparator is configured to receive the reference voltage;
wherein the logic combination circuit comprises a clock pulse signal generation module for generating the clock pulse signal, and the clock pulse signal generation module comprises:
a NOT gate, having an input terminal coupled with the output terminal of the comparator;
a delay module; and a first NOR gate, having a first input terminal coupled with an output terminal of the NOT gate through the delay module, a second input terminal coupled with the output terminal of the comparator, and an output terminal outputting the clock pulse signal.

3. The charge pump control circuit according to claim 1, wherein a positive pole of the comparator is configured to receive the sampling voltage, and a negative pole of the comparator is configured to receive the reference voltage;
   wherein the logic combination circuit comprises a clock pulse signal generation module for generating the clock pulse signal, and the clock pulse signal generation module comprises:
   a delay module;
   a first NOT gate, having an input terminal coupled with the output terminal of the comparator;
   a NAND gate, having a first input terminal coupled with the output terminal of the first NOT gate through the delay module, and a second input terminal coupled with the output terminal of the comparator; and
   a second NOT gate, having an input terminal receiving a signal of the output terminal of the NAND gate, and an output terminal outputting the clock pulse signal.

4. The charge pump control circuit according to claim 1, wherein the reference voltage generating circuit obtains the reference voltage by sampling a voltage of a power supply of the charge pump control circuit.

5. The charge pump control circuit according to claim 4, wherein the reference voltage generating circuit comprises:
   a first resistor, having a first terminal is coupled with a first terminal of a first switch, wherein a second terminal of the first switch is coupled with the power supply;
   a second resistor, having a first terminal coupled with a second terminal of the first resistor, and a second terminal grounded;
   a first capacitor, having a first plate coupled with the power supply; and
   a second capacitor, having a first plate coupled with the first plate of the first capacitor and a first terminal of a second switch, and a second plate grounded, wherein a second terminal of the second switch is coupled with the first terminal of the second resistor;
   wherein control terminals of the first switch and the second switch are configured to receive a control signal outputted by a controller which is configured to generate the control signal according to the comparison result outputted by the comparator.

6. The charge pump control circuit according to claim 5, wherein the reference voltage generating circuit further comprises: a third capacitor, having a first plate coupled with the first terminal of the second resistor, and a second plate grounded.

7. The charge pump control circuit according to claim 1, wherein the feedback circuit comprises:
   a third resistor, having a first terminal coupled with a first terminal of a third switch, wherein a second terminal of the third switch is coupled with an output terminal of the charge pump;
   a fourth resistor, having a first terminal coupled with a second terminal of the third resistor, and a second terminal grounded;
   a fourth capacitor, having a first plate coupled with the output terminal of the charge pump, a second plate coupled with a first terminal of a fourth switch, wherein a second terminal of the fourth switch is coupled with the first terminal of the fourth resistor; and
   a fifth capacitor, having a first plate coupled with the second plate of the fourth capacitor, and a second plate grounded;
   wherein control terminals of the third switch and the fourth switch are configured to receive a control signal outputted by a controller, which is configured to generate the control signal according to the comparison result outputted by the comparator.

8. The charge pump control circuit according to claim 1, wherein the protection circuit comprises a switch transistor and a fifth switch, wherein a drain of the switch transistor is coupled with a first terminal of the fifth switch, a second terminal of the fifth switch is coupled with the output terminal of the reference voltage generating circuit, a source of the switch transistor is grounded, and a gate of the switch transistor is coupled with a predetermined bias voltage; and
   wherein the logic combination circuit comprises a switch control signal generating module, wherein the switch control signal generating module is configured to generate a switch control signal according to the comparison result outputted by the comparator and the clock pulse signal, and a control terminal of the fifth switch is configured to receive the switch control signal.

9. The charge pump control circuit according to claim 8, wherein the switch control signal generating module comprises a second NOR gate, wherein the second NOR gate has a first input terminal receiving an output signal outputted by the comparator, a second input terminal receiving the clock pulse signal, and an output terminal outputting the switch control signal.

* * * * *